(No Model.)

J. M. HUGHES.
BICYCLE STEP.

No. 578,335. Patented Mar. 9, 1897.

WITNESSES
C. D. Kesler
H. G. Mason

INVENTOR
John M. Hughes.
by John Wedderburn
Attorney

UNITED STATES PATENT OFFICE.

JOHN M. HUGHES, OF BROOKLYN, NEW YORK.

BICYCLE-STEP.

SPECIFICATION forming part of Letters Patent No. 578,335, dated March 9, 1897.

Application filed August 13, 1896. Serial No. 602,605. (No model.)

*To all whom it may concern:*

Be it known that I, JOHN M. HUGHES, a citizen of the United States, residing at Brooklyn, in the county of Kings and State of New York, have invented certain new and useful Improvements in Bicycle-Steps; and I do hereby declare the following to be a full, clear, and exact description of the invention, such as will enable others skilled in the art to which it appertains to make and use the same.

The step upon modern bicycles generally consists of an extension of the rear axle or a nut or collar having a milled surface screwed or otherwise secured upon the rear axle. Objection is found to this step, however, by reason of the fact that a very small bearing-surface is provided and slipping of the foot from the step is quite frequent. I propose to obviate the objections to the old form of step by providing one with a broad bearing-surface, which may be readily applied to or removed from the bicycle, is strong and durable, and will provide means whereby the rider may mount or dismount from a point nearer the saddle of the bicycle.

The invention consists of a sleeve or collar adapted to fit upon an extension of the rear axle, having a broad flat milled or roughened bearing-surface projecting forwardly from said sleeve, a forwardly-extending arm, a clip on the front end of said arm adapted to embrace one of the back forks of the bicycle, and a pivotally-mounted arm on the under side of said clip adapted to be moved from one position to another for the purpose of locking or unlocking said clip on said fork.

The invention also consists in other details of construction and combinations of parts which will be hereinafter more fully described and claimed.

Figure 1:
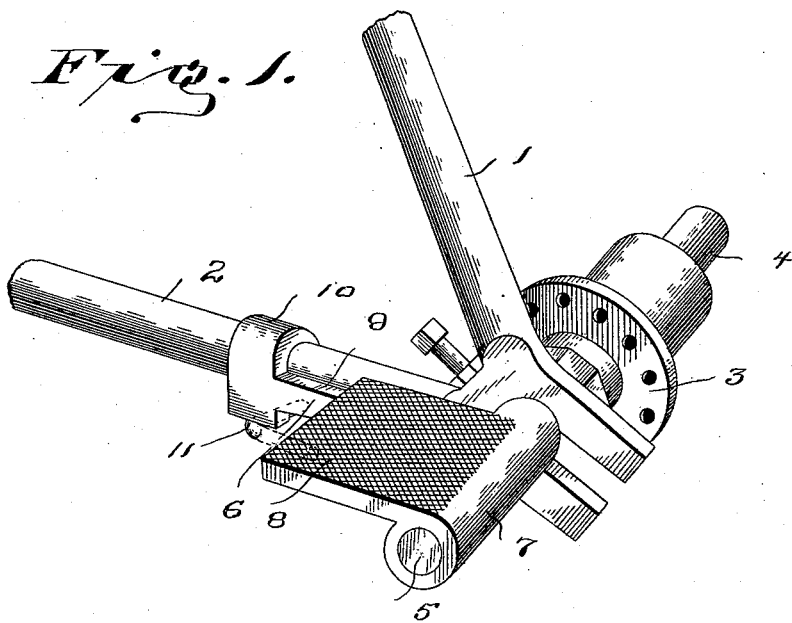
Figure 2:
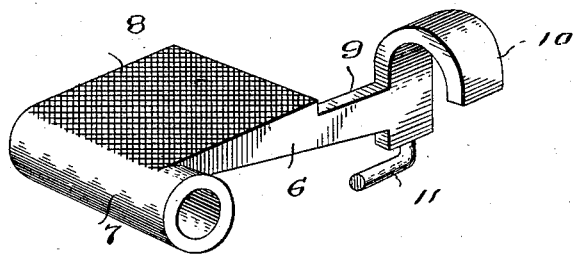

In the drawings forming a part of this specification, Figure 1 represents a perspective view of my improved step shown applied to the frame of a bicycle. Fig. 2 is a similar view of the step detached.

Like reference-numerals indicate like parts in both views.

Between the backstays 1 and the back forks 2 is mounted the rear wheel 3 of the bicycle upon the axle 4. The said axle has an extension 5 projecting outwardly from one side thereof, upon which my improved step 6 is adapted to be secured. Said step is made up of a sleeve 7, surrounding the extension 5 and
having a broad flat rectangular portion 8 projecting forwardly therefrom, constituting the bearing-surface of the step. The upper side of said rectangular portion is milled or otherwise roughened to prevent slipping. Extending forwardly from the inner side of the rectangular portion 8 is an arm 9, having a clip 10 upon its front end, which is adapted to embrace the upper side of the back fork 2 for supporting the forward end of the step. On the under side of the clip 10 is a pivotally-mounted locking-arm 11, which is adapted to be moved so that it lies directly beneath the back fork 2, as clearly shown in Fig. 1. When in this position, the step is securely locked in place. If it be desired to remove the same, the locking-arm 11 is moved to the position shown in dotted lines, when the clip may be readily slipped from the fork 2 and the step removed.

By the construction just described it will be seen that I have provided a step for bicycles which may be readily attached and detached, which has a broad bearing-surface for the foot, and which has its forward end located at a point nearer the sprocket-wheel and consequently nearer to the saddle than the step now in common use. It is extremely simple in construction and can be cheaply made and applied to any bicycle now in use.

Having now described my invention, what I claim as new, and desire to secure by Letters Patent, is—

In a bicycle, the combination with the back forks, the backstays, the rear axle, and an extension of said axle, of a step consisting of a sleeve in which the extension of said axle is adapted to fit, a broad, flat rectangular portion on said sleeve constituting the bearing-surface of the step, a forwardly-extending arm on said step lying in close contact with said fork, a clip upon the front end of said arm adapted to embrace said fork, and a pivotally-mounted locking-arm on the under side of said clip, substantially as and for the purpose described.

In testimony whereof I have signed this specification in the presence of two subscribing witnesses.

JOHN M. HUGHES.

Witnesses:
LEO D. MCCORMICK,
SYLVESTER GROESBEECK.